Nov. 24, 1925.

C. A. WEBER 1,562,669

STUFFING BOX FOR STEAM SHOVELS

Filed Jan. 6, 1921

INVENTOR
Charles A. Weber.
BY Richey, Slough & Tales
His ATTORNEYS.

Nov. 24, 1925.

C. A. WEBER 1,562,669

STUFFING BOX FOR STEAM SHOVELS

Filed Jan. 6, 1921

INVENTOR
Charles A. Weber.
BY
Richey, Slough & Tales,
ATTORNEY

Patented Nov. 24, 1925.

1,562,669

UNITED STATES PATENT OFFICE.

CHARLES A. WEBER, OF LORAIN, OHIO, ASSIGNOR TO THE THEW SHOVEL COMPANY, OF LORAIN, OHIO, A CORPORATION OF OHIO.

STUFFING BOX FOR STEAM SHOVELS.

Application filed January 6, 1921. Serial No. 435,545.

*To all whom it may concern:*

Be it known that I, CHARLES A. WEBER, a citizen of the United States, residing at Lorain, in the county of Lorain and State of Ohio, have invented certain new and useful Improvements in Stuffing Boxes for Steam Shovels, of which the following is a full, clear, concise, and exact description, such as will enable others skilled in the art to which it appertains to make and use the same.

My invention relates to stuffing boxes for steam shovels, and more particularly to such said stuffing boxes as may be employed in the steam connection between the boiler, which is commonly mounted within the cab of a steam shovel and a steam engine, which is mounted upon the boom, for the purpose of operating the shovel crowd mechanism, whereby the shovel supporting shaft is thrust forwardly or rearwardly, as may be desired.

It has been found where swivel connections have been employed in such steam line connection, that the steam line becomes displaced and the joints loosened or opened, due to the fact that the boom carrying a part of the steam connection pipes is elevated or lowered and such joints are not located at the center of rotation of the vertical movement of the boom.

An object of my invention, therefore, is to provide an improved stuffing box for the purpose of efficiently uniting the steam pipes located on the boom and leading to the steam engine carried thereby, with the steam pipes carried by the cab and leading from the steam boiler, and which stuffing box will be concentrically located with the shaft upon which the boom is adapted to rotate when it is being elevated or lowered.

Another object is to accomplish the aforesaid object in a stuffing box which is inexpensive to manufacture, efficient in use and which may be continued in use for long periods with little or no attention, and in which the interior parts are capable of being exposed, without removing the stuffing box from the said boom shaft upon which it is carried, and the parts renewed with a minimum of labor within a short time.

Other objects of my invention and the invention itself will be better understood by reference to the accompanying drawings illustrating a preferred embodiment of my invention.

Referring to the drawing.

Figure 2:
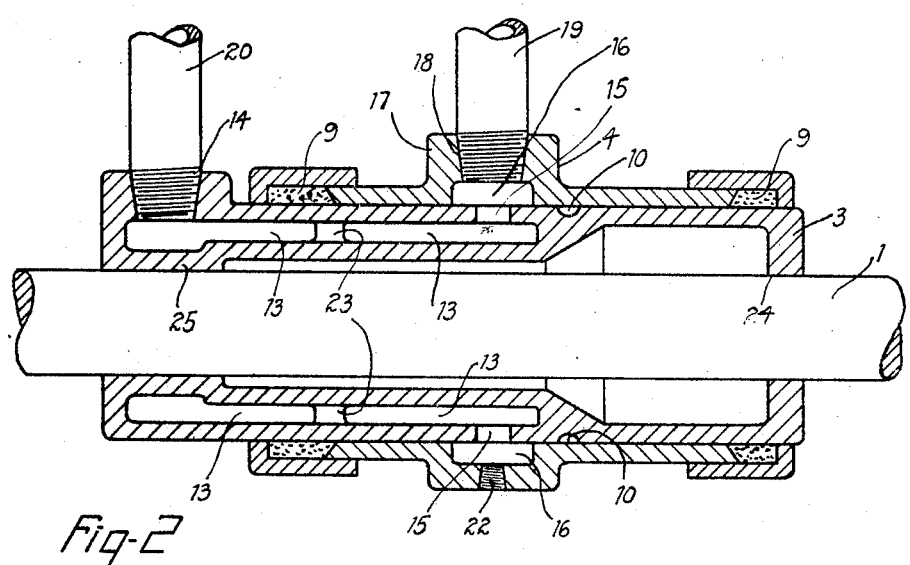
Fig. 2 shows a vertical cross-sectional view of the embodiment illustrated in Fig. 1.
Figure 1:
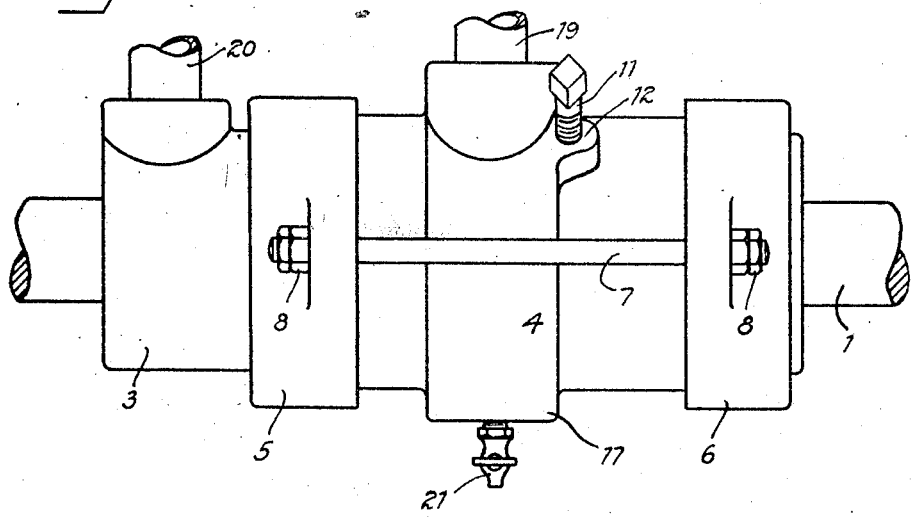
Fig. 1 shows a side elevation of an embodiment of my invention.
Figures 3, 4:
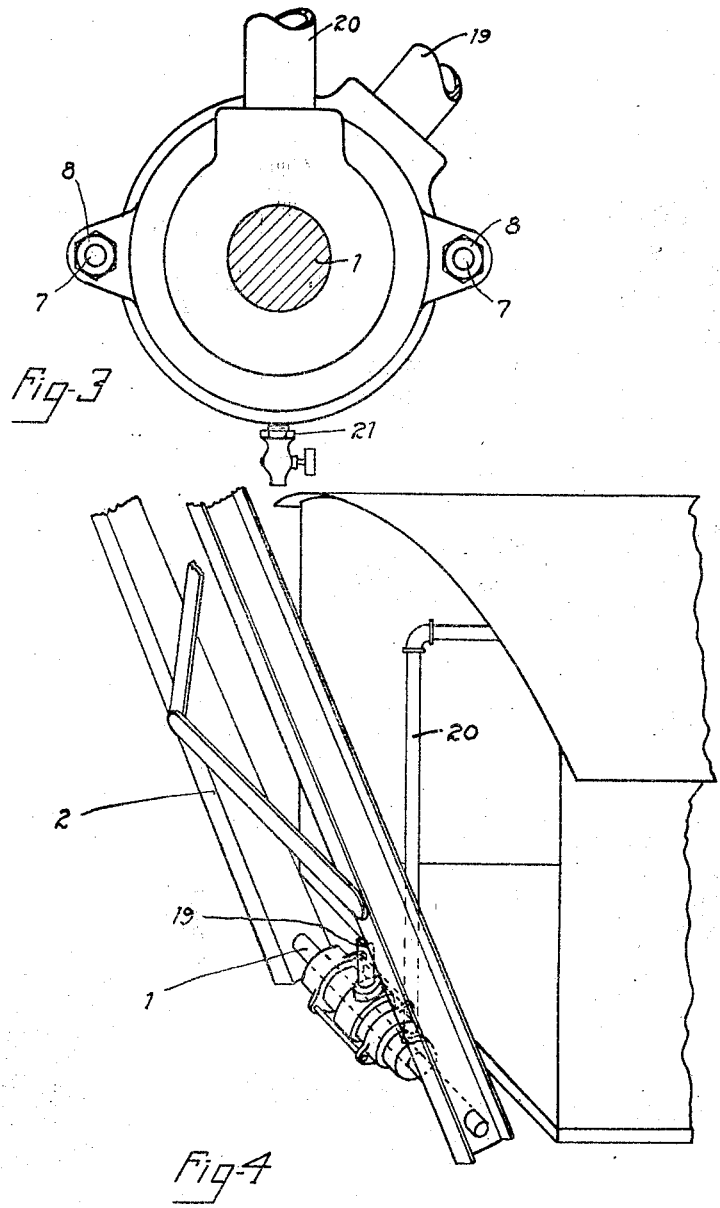
Fig. 3 shows an end view of the embodiment of Fig. 1, the supporting boom shaft being therein shown in section.
Fig. 4 shows a perspective view of the stuffing box of my invention, together with a portion of the boom, cab, and steam pipe connections.

Referring now to the drawings in all of which like parts are denoted by like reference characters, at 1 I show the supporting shaft, and which shaft also supports the boom 2 which carries the stuffing box of my invention. The said shaft 1 passes through an inner tubular casting 3, which is rotatably mounted on the shaft 1. At 4 I show a stuffing box gland adapted to be rotatably mounted over the inner tubular member 3. At 5 and 6 I show end clamping rings for the gland member 4 and at 7 I show one of a pair of bolts, which by means of clamping nuts 8 are adapted to firmly press the rings 5 and 6 towards each other. At 9 at either end of the tubular gland member 4 I place stuffing box packing, which is compressed tightly between the rings 5 and 6 and the ends of the gland member 4, for a purpose later to be made apparent.

The gland member 4 is rotatably mounted on the inner tubular member 3 and is prevented from being longitudinally displaced from a given position thereon by a groove 10 on the outside of the tubular member and a co-operating set-screw 11 which is threaded into a lug 12 on the gland member, and which screw has its end projecting into the said groove 10. The tubular member 3 has a steam channel 13 leading from a pipe opening 14, disposed at one end of the tubular member 3, to a series of openings 15 disposed in a circle through the outer wall of the tubular member 3 and which openings communicate with the channel 13 and with an annular channel 16 provided in the bossed portion 17 of the gland member 4.

The gland boss 17 has a threaded opening 18 adapted to receive a steam pipe 19 for the egress, or in some cases, the ingress, of steam which passes through the channel 13 from, or in some cases to, the steam pipe 20, which is threaded into the opening 14 of the inner tubular member 3. A petcock 21 communicating by an opening 22 into the annular channel 16 is provided for the purpose of draining the stuffing box channels of condensed steam or vapor, whenever this is desired. This stuffing box being lowermost in the entire steam line also serves to discharge water from all of the steam pipes leading to the stuffing box, provided, of course, that the boom end is raised with respect to the point of boom support, and which is usually the case.

Webs, such as 23, may join the inner and outer walls which bound the annular channel 13 for the purpose of adding strength to the casting comprising the tubular member 3. I so construct the inner tubular member 3 that the bearing surface which contacts with the shaft 1 is reduced to a minimum, the tubular member 3 only resting at 24 and 25 on either end of the stuffing box on the shaft 1.

It will now be apparent that either of the pipes 19 or 20 may independently rotate with respect to the supporting rod 1, as when the boom is elevated or lowered, and the center of rotation of the said boom and of the said stuffing box connecting pipes is the same, the pipes will not be displaced, their joints will not be loosened and therefore, the objections previously recited as attending the use of structures of the prior art will be absent.

Having thus described my invention, I wish it to be understood that numerous and extensive departures may be made from the embodiment herein illustrated and described, but without departing from the spirit of my invention.

What I claim as my invention is:

1. A stuffing box for steam shovels and the like comprising an inner rotatably mounted member having a channel within the wall thereof and inlet and outlet openings extending therefrom, and an outer member rotatably mounted on said inner member having a channel in connection with the outlet openings in said inner member, said outer member having an outlet opening therein.

2. A stuffing box for steam shovels and the like comprising an inner rotatably mounted member having a channel within the wall thereof, said member having an inlet opening and a circumferential series of outlet openings through the wall thereof, and a gland rotatably mounted on said inner member, said gland having a boss forming an outer channel which extends over the series of outlet openings in said inner member, said boss having an outlet opening therethrough.

3. In a steam pipe line for steam shovels and the like, a stuffing box comprising an inner channel member having inlet and outlet openings, a gland having inlet and outlet openings in communication with the outlet openings in said inner member, an inlet pipe secured within the inlet opening of said inner member, and an outlet pipe secured within the outlet opening in said gland, said member and said gland being adapted to rotate with respect to each other.

4. A stuffing box for steam shovels and the like, comprising an inner rotatably mounted member having a channel within the wall thereof and inlet and outlet ports therefor, said member having a circular groove in its outer wall, an outer member rotatably mounted on said inner member having a channel in communication with the outlet opening in said inner member, said outer member having an outlet port for the channel, and a set screw carried by said outer member adapted to be screwed within the circular groove in the inner member to prevent relative longitudinal displacement of said members.

5. A stuffing box for steam shovels and the like comprising, an inner tubular rotatably mounted member having a channel intermediate the inner and outer wall thereof and inlet and outlet ports therefor, and an outer tubular member rotatably mounted upon said inner member and having a chamber in communication with the outlet port in said inner member, the chamber of said outer member having an outlet port leading therefrom.

In witness whereof, I have hereunto signed my name this 28 day of December, 1920.

C. A. WEBER.